United States Patent
Carcouet et al.

(10) Patent No.: US 10,059,216 B2
(45) Date of Patent: Aug. 28, 2018

(54) ACCUMULATOR BATTERY PROTECTED AGAINST INTERNAL SHORT CIRCUITS

(71) Applicant: Commissariat a l'energie atomique et aux energies alternatives, Paris (FR)

(72) Inventors: Sebastien Carcouet, Vif (FR); Bruno Beranger, Saint Martin d'uriage (FR); Daniel Chatroux, Teche (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 713 days.

(21) Appl. No.: 14/358,894

(22) PCT Filed: Nov. 14, 2012

(86) PCT No.: PCT/EP2012/072600
§ 371 (c)(1),
(2) Date: May 16, 2014

(87) PCT Pub. No.: WO2013/072358
PCT Pub. Date: May 23, 2013

(65) Prior Publication Data
US 2014/0354232 A1 Dec. 4, 2014

(30) Foreign Application Priority Data
Nov. 17, 2011 (FR) ...................... 11 60460

(51) Int. Cl.
*H02J 7/00* (2006.01)
*B60L 11/18* (2006.01)
(Continued)

(52) U.S. Cl.
CPC ......... *B60L 11/185* (2013.01); *B60L 11/1877* (2013.01); *H01M 2/202* (2013.01); *H02J 7/0014* (2013.01); *H02J 7/0021* (2013.01); *H02J 7/0031* (2013.01); *B60L 11/1861* (2013.01); *B60L 11/1866* (2013.01); *H01M 2/206* (2013.01); *H01M 10/052* (2013.01); *H01M 10/441* (2013.01);
(Continued)

(58) Field of Classification Search
CPC .............. H01M 10/42; H01M 10/4257; G01R 31/3606; G01R 31/3679; H02J 7/0016
USPC ........................ 320/118, 117, 136
See application file for complete search history.

(56) References Cited

U.S. PATENT DOCUMENTS 4,890,186 A * 12/1989 Matsubara ............. H01H 87/00
337/15
4,894,588 A * 1/1990 Stack .................... H05B 39/09
315/224

(Continued)

FOREIGN PATENT DOCUMENTS

EP        0880214      11/1998
WO    WO 2011/003924    1/2011

*Primary Examiner* — Drew A Dunn
*Assistant Examiner* — Tarikh Rankine
(74) *Attorney, Agent, or Firm* — Occhiuti & Rohlicek LLP (57) ABSTRACT

An accumulator battery, comprising at least: first and second stages electrically connected in series, each stage including at least first to third accumulators electrically connected in parallel. There are at least first and second current limiters via which the first to third accumulators of said first stage are connected in parallel and via which the first to third accumulators of said second stage are connected in parallel.

23 Claims, 4 Drawing Sheets (51) Int. Cl.
  *H01M 10/42* (2006.01)
  *H01M 10/46* (2006.01)
  *H01M 2/20* (2006.01)
  *H01M 10/44* (2006.01)
  *H01M 10/052* (2010.01)

(52) U.S. Cl.
  CPC ............... *H01M 2010/4271* (2013.01); *H01M 2200/108* (2013.01); *H01M 2220/20* (2013.01); *H02J 7/0016* (2013.01); *H02J 7/0018* (2013.01); *H02J 7/0019* (2013.01); *Y02E 60/122* (2013.01); *Y02T 10/7055* (2013.01)

(56) References Cited

U.S. PATENT DOCUMENTS

| | | | | |
|---|---|---|---|---|
| 4,908,799 | A * | 3/1990 | Gaudronneau | G11C 16/26 365/185.23 |
| 5,898,291 | A * | 4/1999 | Hall | H02J 7/0026 320/118 |
| 6,278,964 | B1 * | 8/2001 | Fang | G01R 31/31832 703/14 |
| 6,700,351 | B2 * | 3/2004 | Blair | H02J 7/0022 320/125 |
| 7,962,212 | B2 * | 6/2011 | Signoff | A61N 1/378 320/121 |
| 2002/0146617 | A1 * | 10/2002 | Johnson | B64G 1/425 429/50 |
| 2003/0094923 | A1 * | 5/2003 | Emori | B60L 11/185 320/126 |
| 2006/0012336 | A1 | 1/2006 | Fujita | |
| 2006/0072950 | A1 | 4/2006 | Lim et al. | |
| 2006/0158816 | A1 * | 7/2006 | Harris | H02H 9/025 361/118 |
| 2006/0192529 | A1 * | 8/2006 | Kimura | H02J 7/0026 320/116 |
| 2006/0216600 | A1 * | 9/2006 | Inagaki | H01M 2/06 429/231.1 |
| 2007/0287043 | A1 * | 12/2007 | Marsh | B82Y 30/00 429/431 |
| 2009/0066291 | A1 * | 3/2009 | Tien | H02J 7/0016 320/118 |
| 2009/0079384 | A1 * | 3/2009 | Harris | B60L 7/14 320/102 |
| 2009/0085553 | A1 * | 4/2009 | Kumar | H02J 7/0024 323/351 |
| 2010/0072950 | A1 * | 3/2010 | Tatebayashi | H02J 7/0031 320/134 |
| 2010/0261043 | A1 * | 10/2010 | Kim | H01M 10/4207 429/61 |
| 2011/0227416 | A1 * | 9/2011 | Lecourtier | H02J 9/061 307/66 |
| 2012/0007567 | A1 * | 1/2012 | Disney | H02M 1/44 320/166 |
| 2012/0013189 | A1 * | 1/2012 | Jenkins | H02J 1/14 307/80 |
| 2012/0074896 | A1 * | 3/2012 | Lui | H01L 27/0617 320/107 |
| 2012/0107651 | A1 * | 5/2012 | Hotta | H01M 2/202 429/61 |
| 2012/0286578 | A1 * | 11/2012 | Uno | H02J 7/0014 307/77 |

* cited by examiner

ACCUMULATOR BATTERY PROTECTED AGAINST INTERNAL SHORT CIRCUITS

RELATED APPLICATIONS

Under 35 USC 371, this application is the national stage of PCT/EP2012/072600, filed on Nov. 14, 2012, which claims the benefit of the Nov. 17, 2011 filing date of French application FR1160460, the contents of which are herein incorporated by reference.

FIELD OF INVENTION

The invention relates to electrochemical accumulator batteries. These can, for example, be used in the field of electrical and hybrid transportation or embedded systems.

BACKGROUND

The combustion/electrical hybrid or electrical only vehicles notably include high power batteries. Such batteries are used to drive an electric motor with alternating current via an inverter. The voltage levels needed for such motors reach several hundreds of Volts, typically of the order of 400 Volts. Such batteries also have a high capacity in order to favor the range of the vehicle in electric mode.

To obtain high powers and capacities, several groups of accumulators are placed in series. The number of stages (number of groups of accumulators) and the number of accumulators in parallel in each stage vary as a function of the voltage, of the current and of the capacity desired for the battery. The association of a plurality of accumulators is called an accumulator battery. The electrochemical accumulators used for such vehicles are generally of lithium ion type for their capacity to store a considerable amount of energy with a weight and a volume that are contained. The lithium-ion iron phosphate, LiFePO4, battery technologies are the object of significant developments because of an intrinsically high level of safety, to the detriment of a slightly lower energy storage density. An electrochemical accumulator usually has a nominal voltage of the following order of magnitude:

3.3 V for a lithium-ion iron phosphate, LiFePO4, technology, 4.2 V for a technology of lithium-ion type based on cobalt oxide. The invention can also be applied to supercapacitors.

Figure 1:
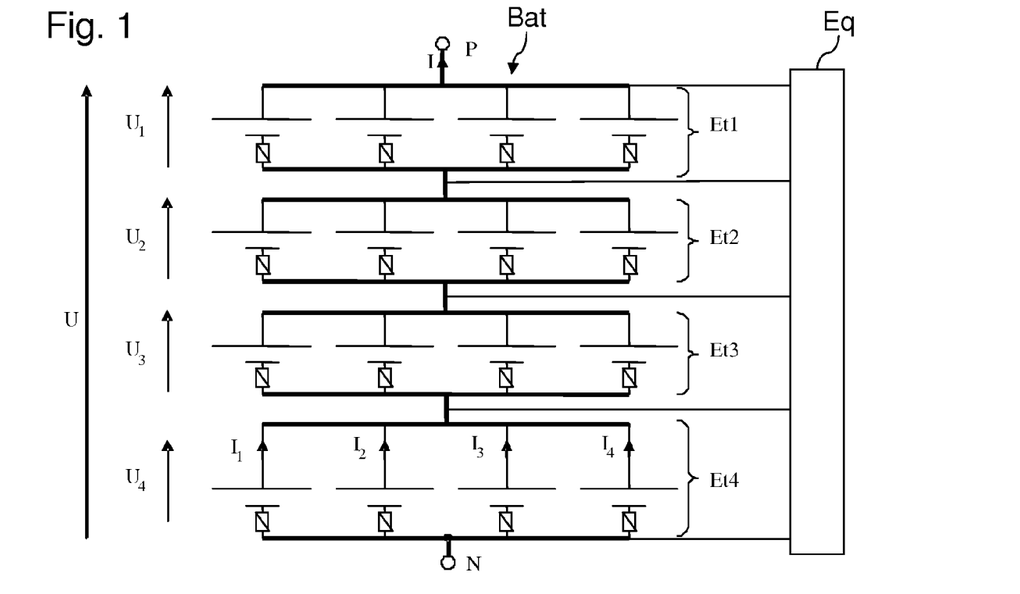
FIG. 1 is a schematic representation of an exemplary battery according to the prior art.

FIG. 1 represents a lithium-ion accumulator battery Bat known from the prior art. The battery Bat is made up of four stages Et1, Et2, Et3 and Et4 connected in series. Each stage comprises four similar accumulators, connected in parallel. The terminals of the accumulators of one and the same stage are connected together via large section electrical connections. Each stage is also connected to the adjacent stages via large section electrical connections in order to allow high currents to pass, corresponding to the sum of the currents from the accumulators of a stage. One or more loads are intended to be connected to the N and P terminals of the battery 1.

The voltage at the terminals of the four stages is respectively denoted U1, U2, U3 and U4. In this arrangement, the total voltage U between the N and P terminals of the battery 1 is the sum of the voltages U1, U2, U3 and U4. The current passing through each accumulator of the fourth stage Et4 is respectively denoted I1, I2, I3 and I4. The current I generated on the P terminal of the battery Bat is the sum of the currents I1, I2, I3 and I4. A charge equalizing circuit Eq is connected to the terminals of each stage of the battery Bat.

Throughout the life of the battery, certain faults may appear on some accumulators that make up the battery. A fault on one accumulator is generally reflected in the short-circuiting of the accumulator, or an open-circuiting, or in a significant leakage current in the accumulator. It is important to know the impact of the failure of an accumulator on the battery. An open-circuit or short-circuit can cause an overall failure of the entire battery.

In the case of the appearance of a significant leakage current in an accumulator of a stage, the battery behaves like a resistor which provokes a discharging of the accumulators of the stage considered to zero. The risks of a fire starting are low because the energy is dissipated relatively slowly. In lithium-ion technology, the discharging of the accumulators of the stage to a zero voltage damages them which means replacing them in addition to the accumulator that initially failed. When an accumulator forms a short circuit, the other three accumulators of the stage will initially discharge into this accumulator, because of the large section of the electrical connections between them. The fuse placed in series with the short-circuited accumulator will stop the spurious discharging of the other three accumulators.

In order to protect the battery Bat from the consequences of a short circuit in an accumulator, each accumulator has a fuse which is connected to it in series. When an accumulator forms a short circuit, the current passing through it increases significantly and causes its series fuse to blow in order to protect the rest of the battery Bat. In the absence of a fuse, the energy dissipation in the short-circuited accumulator would cause it to overheat together with the other accumulators being discharged. Such a dissipation could be the cause of a fire being started. The lithium-ion technologies are particularly at risk when a stage comprises a large number of accumulators in parallel to store significant energy. Cobalt oxide is known as a strongly reactive chemical. Iron phosphate is known to be the safest chemical. The use of fuses is therefore particularly appropriate for these technologies, particularly for iron phosphate which tolerates a certain overvoltage.

However, the presence of fuses in series between the accumulator stages induces not-inconsiderable losses, particularly challenging for embedded applications.

The document WO2011/003924 describes a battery structure that makes it possible to eliminate the losses induced by a protection system in the normal operation of the battery, and that also makes it possible to ensure a continuity of service of the battery when an element of the battery is short-circuited or open-circuited.

SUMMARY

In this document, the battery comprises at least first and second branches each having at least first and second accumulators connected in series. The battery also comprises a fuse via which the first accumulators are connected in parallel and via which the second accumulators are connected in parallel. The braking threshold of the fuse is dimensioned to open when one of the accumulators is short-circuited.

When the battery powers an electric vehicle motor, its recharging takes place either when the vehicle has stopped, by connecting the battery to the electrical network, or while the vehicle is running during phases in which the electric motor is operating as generator. During a fast recharge when the vehicle has stopped or when the electric motor is operating as generator, not-inconsiderable recharging or equalizing currents may be applied to the accumulators. The fuses connected in the parallel connections can thus be passed through by relatively high currents. Furthermore, some fuses may be passed through by the aggregate of the recharging or equalizing currents intended for a plurality of accumulators of one and the same stage and remote from the recharging connection. Some fuses may thus represent a common connection connecting a number of accumulators to the equalizing circuit. Consequently, the dimensioning of the fuses for the parallel connections may prove difficult to ensure, at the same time, the protection of the accumulators, the continuity of service of the battery in the event of a malfunction of an accumulator, and the recharging of the different accumulators. Losses by Joule effect may also occur during the recharging or the equalizing because of the currents passing through the fuses. The life of the fuses may also be shortened by the repeated application of charge currents passing through them.

The document US2010/072950 describes an accumulator battery including:
- three stages connected in series;
- three accumulators in parallel in the stages;
- respective fuses connected in series with each of the accumulators;
- transistors associated with respective fuses, applying an alert signal to a control circuit when the voltage at terminals of their fuse crosses a threshold;
- connections ensuring the parallel connection of the accumulators of each of the stages.

No component common to two stages is involved in the parallel connection of the respective accumulators of these two stages.

The function of the fuses is to break the current in the event of an overcurrent. The current passing through the transistors when they are closed is, moreover, negligible compared to the current delivered by the accumulators.

The invention aims to resolve one or more of these drawbacks. The invention thus relates to an accumulator battery as defined in the claims.

The invention relates also to a system defined in the claims.

Other features and advantages of the invention will emerge clearly from the following description thereof, given by way of indication and as a nonlimiting example, with reference to the attached drawings.

DETAILED DESCRIPTION

Hereinbelow, "current limiter" will be used to designate a component or circuit passed through by a current that increases with the voltage at its terminals when this voltage is below a saturation threshold, and passed through by a substantially constant saturation current when this voltage is above said saturation threshold.

Advantageously, the saturation current is 50% greater than the maximum value of the current for any voltage at the terminals of the limiter below the saturation threshold. Advantageously, the saturation current is at least equal to the maximum value of the current for a voltage at the terminals of the limiter below the saturation threshold.

Figure 2:
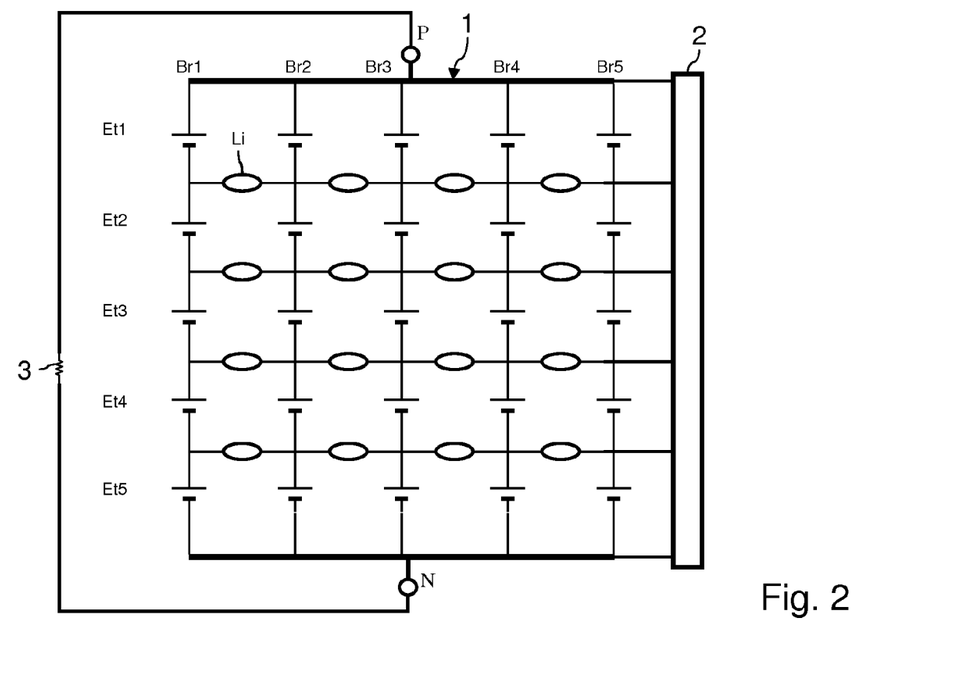
FIG. 2 is a schematic representation of an exemplary battery according to one embodiment of the invention.

FIG. 2 is a schematic representation of an exemplary battery 1 according to one embodiment of the invention. The battery 1 comprises five stages Et1 to Et5 electrically connected in series. Each stage comprises five accumulators or electrochemical cells electrically connected in parallel. The battery 1 thus comprises five branches Br1 to Br5 electrically connected in parallel. The parallel connection of the accumulators of a stage is produced via current limiters Li. Each current limiter Li of the example participates in the parallel connection of two accumulators of a stage, and thus to the parallel connection of two accumulators of another stage.

An electrical load 3 is connected to the P and N terminals of the battery 1, so as to be powered by this battery. A charge equalizing management circuit 2 is electrically connected to each of the stages Et1 to Et5. The circuit 2 is configured to proceed with the charging of the accumulators of these stages. The circuit 2 is also configured to handle the monitoring of the state of charge of the accumulators. The circuit 2 is also configured to implement an equalizing of the charge of the accumulators of these stages, based on the monitoring of their state of charge. The charging/monitoring of state of charge/charge equalizing functions are known per se and will not be detailed more. At the P and N terminals, the battery 1 advantageously comprises power collectors passed through by the parallel currents originating from the different branches Br1 to Br5.

The current limiters make it possible to limit the current output through a short-circuited accumulator, in order to avoid any risk of overheating and of fire being started, and do so in the presence of a large number of accumulators connected in parallel in each stage. The rate of discharge of the accumulators of a stage including a short-circuited accumulator is also limited, which can make it possible to continue to use the battery 1. Moreover, a short-circuited accumulator is not isolated from the circuit 2, which makes it possible to detect its failure and to continue to monitor it. By measuring the voltage at each stage, the circuit can thus detect a failure, by confirming for example that a stage is discharging or is charging differently from the other stages. Because a short-circuited accumulator remains connected in parallel to the other accumulators of the stage, it is possible to detect that the other accumulators are being discharged progressively into it.

The current limiters also make it possible to implement a distribution of current between the accumulators of the different branches in the presence of a short-circuited accumulator.

The use of current limiters in the parallel connections of the accumulators makes it possible to apply charge currents of high amplitudes to the accumulators, to implement either a fast charge by the electrical network (necessary to ensure reduced charging times), or a charge by an electric motor operating as generator (for example during a braking phase of a vehicle), without inducing any untimely braking of these parallel connections.

During a charging or discharging phase, the main current in a branch passes through all the accumulators connected in series in this branch. During such operation, if all the accumulators are similar and exhibit the same state of charge or discharge, no cross current circulates through the current limiters Li.

Figure 3:
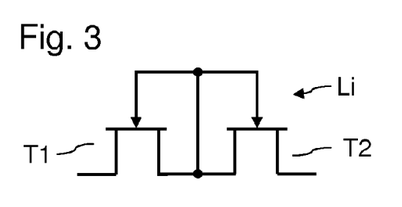
FIG. 3 illustrates an exemplary two-way current limiter.

The current limiters Li may be of any appropriate type. FIG. 3 illustrates an exemplary current limiter Li based on the use of transistors of JFET type. The current limiter Li of this example advantageously comprises two transistors T1 and T2 mounted head-to-tail. The transistor T1 has its gate connected to its source. Its drain is intended to be connected to a terminal of an accumulator. The transistor T1 thus ensures a limitation of the current passing through it in the direction going from its drain to its source. The transistor T2 has its gate connected to its source. Its drain is intended to be connected to a terminal of an accumulator. The transistor T2 thus ensures a limitation of the current passing through it in the direction going from its drain to its source. A transistor of JFET type offers the advantage of being naturally closed in the absence of any control circuit to bias its gate. There is thus no need to have a control circuit to allow for the passage of the transverse charge or recharge equalizing currents of the accumulators.

The mounting of two transistors head-to-tail in the current limiter Li makes it possible to produce a two-way current limitation. Thus, a current limiter Li:
limits the discharge current from an accumulator to which it is connected when the latter is discharging into another short-circuited accumulator;
limits the charge current (from a number of accumulators) to the accumulator to which it is connected when the latter is short-circuited.

Figure 6:
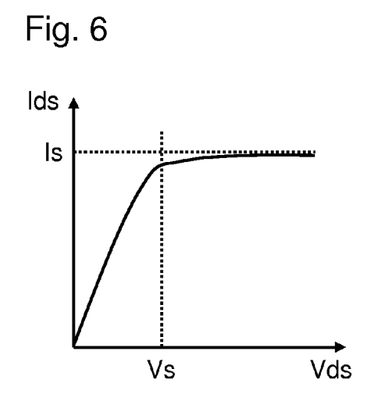
FIG. 6 is a diagram illustrating the usual current response of a JFET transistor as a function of the voltage applied between its source and its drain.

FIG. 6 illustrates a conventional exemplary characteristic of a JFET transistor for a given potential difference Vgs between gate and source. The Y-axis corresponds to the drain-source current Ids, the X-axis corresponding to the potential difference Vds between its drain and its source.

As is known per se, the current Ids is substantially proportional to the voltage Vds when Vds is lower than the saturation voltage Vs. The current is substantially constant and close to a saturation current Is when the voltage Vds is above said saturation threshold Vs.

A person skilled in the art will be able, in a manner known per se, to determine the dimensioning of the transistors of the current limiters to obtain desired saturation current Is and saturation voltage Vs values.

In the example illustrated in FIG. 6, the current Ids for a voltage Vds greater than Vs is greater than the current Ids for any voltage Vds lower than Vs. It is, however, possible to envisage a turning back of the current when Vds crosses the value Vs, particularly because of the overheating of the transistors. However, the current Ids remains significant when Vds is greater than Vs, for example at least equal to 0.5*Is.

The JFET-type transistor(s) of the current limiter Li can also be replaced by transistors of depleted MOSFET type whose gate is connected to the source and whose drain is connected to a terminal of an accumulator. Such a transistor can also be naturally closed in the absence of a control circuit to bias its gate.

The JFET-type transistor(s) of the current limiter Li can also be replaced by transistors of N-channel-type enriched MOSFET type. Since such a transistor is naturally open, its gate has to be permanently controlled to keep it closed.

Figure 4:
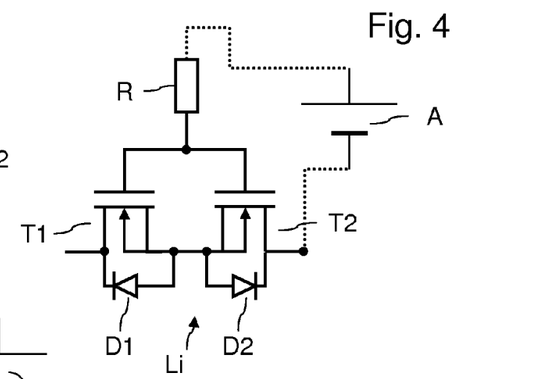
FIG. 4 illustrates another exemplary two-way current limiter.

FIG. 4 illustrates a first exemplary structure of a limiter Li that makes it possible to keep two transistors of N-channel-type enriched MOSFET type in the closed state, without requiring an external control circuit to bias its gate.

Two head-to-tail Mos are used because of the presence of a diode junction internal to the Mos between drain and source.

The limiter Li comprises a transistor T1. The diode D1 models the diode intrinsic to the Mos transistor T1, whose anode is connected to the source of the transistor T1 and whose cathode is connected to the drain of the transistor T1. The limiter Li comprises a transistor T2. The diode D2 models the diode intrinsic to the Mos transistor T2, whose anode is connected to the source of the transistor T2 and whose cathode is connected to the drain of the transistor T2. The gate of the transistors T1 and T2 is connected via one and the same resistor R to a terminal of an accumulator A. In practice, the voltage at the terminals of the accumulator A biases the gate of the transistors T1 and T2 and therefore keeps them both on.

Figure 5:
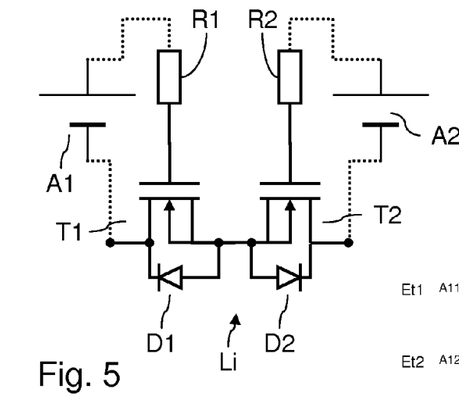
FIG. 5 illustrates yet another exemplary two-way current limiter.

FIG. 5 illustrates a second exemplary structure of limiter Li that makes it possible to keep two NMos-type transistors in the closed state, without requiring an external control circuit to bias its gate.

Two accumulators A1 and A2 are connected in parallel in one and the same stage. The source of the transistor T1 is connected to a first terminal of the accumulator A1. The gate of the transistor T1 is connected to a second terminal of the accumulator A1 via a resistor R1. The source of the transistor T2 is connected to a first terminal of the accumulator A2. The gate of the transistor T2 is connected to a second terminal of the accumulator A2 via a resistor R2. The transistors T1 and T2 are connected by their source. The respective intrinsic diodes D1 and D2 of the MOS transistors T1 and T2 are also illustrated. The voltages at the terminals of the accumulators A1 and A2 bias the respective gates of the transistors T1 and T2 and therefore keep them both on.

Even by keeping the NMos transistors T1 and T2 permanently closed, their consumption remains relatively small in normal operation because the gate oxide of the Mos is a capacitor which therefore consumes no permanent current. Because of this, a constant voltage is applied to their gate corresponding to the voltage of the accumulators A1 and A2, typically of the order of 3.3 V for accumulators of LiFeP type.

Figure 7:
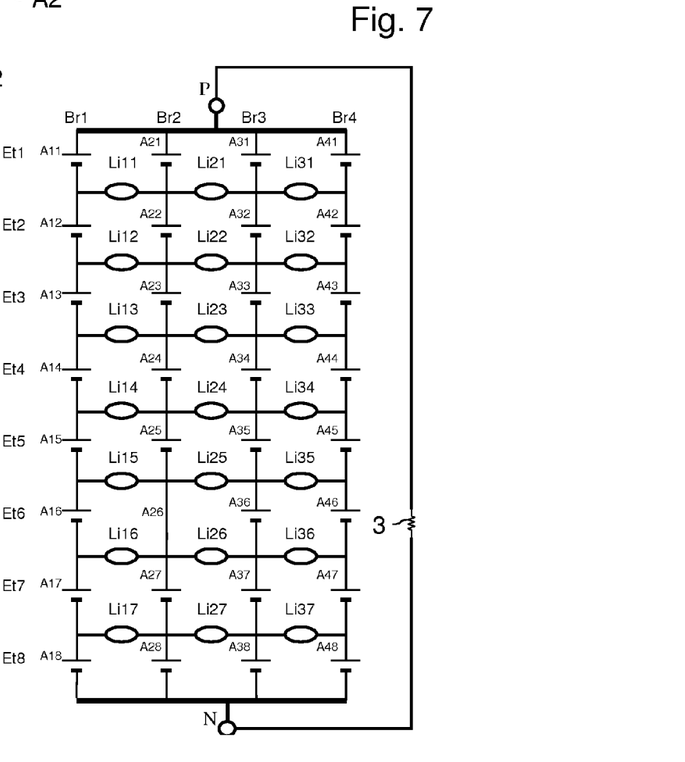
FIG. 7 is a schematic representation of an exemplary battery according to one embodiment of the invention, having been the subject of simulations on the malfunctioning of an electrochemical cell.

As illustrated in FIG. 7, a battery 1 according to the invention advantageously comprises accumulators of lithium-ion type LiFeP with a number of stages greater than or equal to 7 (in fact 8 in this example). In practice, an accumulator of this type tolerates an overvoltage (voltage that can be as high as 4.2 V) and the overvoltage induced in the accumulators of a branch including a short-circuited accumulator thus does not induce their destruction or a safety risk for such a high number of stages.

The first branch Br1 includes accumulators A11 to A18 connected in series. The second branch Br2 includes accumulators A21 to A28 connected in series. The third branch Br3 includes accumulators A31 to A38 connected in series. The fourth branch Br4 includes accumulators A41 to A48 connected in series. Current limiters Li11 to Li17 produce the parallel connection of the accumulators of the first and second branches. Current limiters Li21 to Li27 produce the parallel connection of the accumulators of the second and third branches. Current limiters Li31 to Li37 produce the parallel connection of the accumulators of the third and fourth branches.

Malfunction simulations were performed with a model of a battery 1 according to FIG. 7. For these simulations, the accumulators were likened to 3.3 V voltage sources in series with an internal resistance of $0.01\Omega$. The current limiters were dimensioned with a saturation current of 1 A, with a nominal resistance of $0.015\Omega$.

Figure 8:
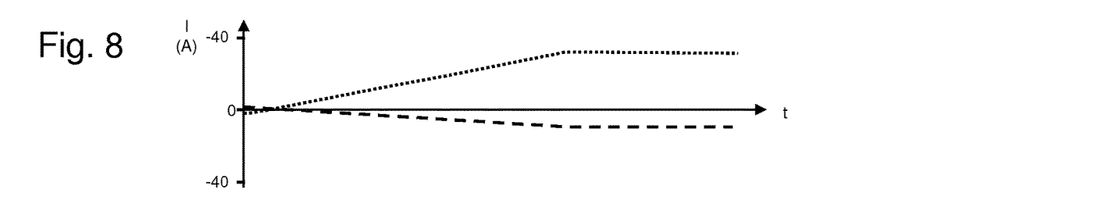
FIG. 8 is a diagram illustrating the trend of the current in the electrochemical cells of the battery of FIG. 7.
Figure 9:
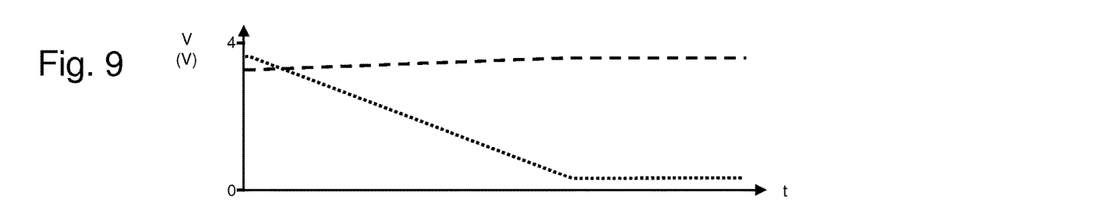
FIG. 9 is a diagram illustrating the trend of the voltage at the terminals of different electrochemical cells of the battery of FIG. 7.

In the example of FIG. 7, the accumulator A26 undergoes a short-circuit malfunction. FIG. 8 is a diagram representing the trend of the current through the different branches following the occurrence of the malfunction. Because of the presence of the current limiters Li15, Li25, Li35 and Li16, Li26, Li36, the transversal charge currents originating from the accumulators A16, A36 and A46 remain relatively limited. Because of this, the charge current received by the branch Br2 does not come from the transversal charge currents but via the external connections of the branches Br1, Br3, Br4 not provided with limiters. The branches Br1, Br3 and Br4 therefore supply a charge current (broken line). The branch Br2 receives a charge current (dotted line), corresponding to the aggregate of the charge currents of the branches Br1, Br3 and Br4. FIG. 9 is a diagram representing the voltage at the terminals of the accumulator A26 (dotted line) and the voltage at the terminals of the accumulators of the branch Br2 (broken line) exempt from malfunctions. The voltage at the terminals of the failing accumulator A26 drops progressively to a value close to 0 V. The voltage at the terminals of the other accumulators of the branch Br2 increases progressively from a value of 3.3 V to approximately 3.8 V, to offset the voltage drop in the stage Et6. This voltage is well within the supportable limits of the other accumulators of the branch Br2 in LiFeP technology.

Figure 10:
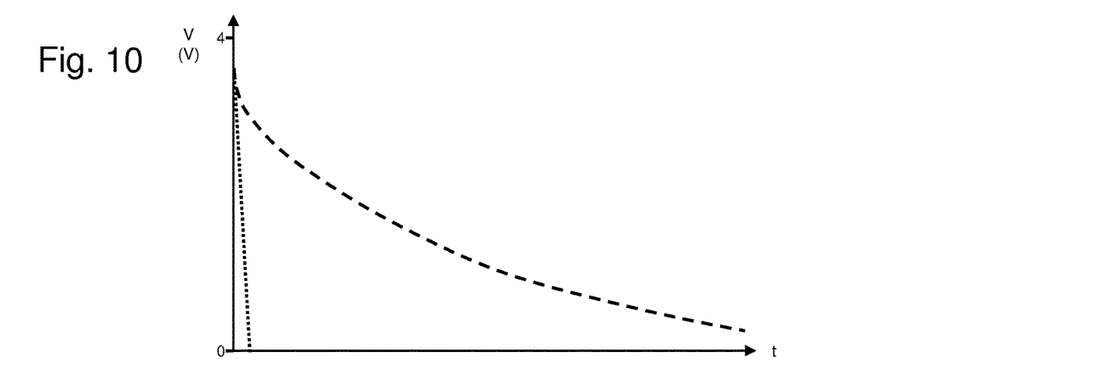
FIG. 10 is a diagram illustrating the trend of the voltage at the terminals of electrochemical cells in a stage including a failing electrochemical cell.

As illustrated in FIG. 10, the rate of discharge of the accumulators A16, A36 and A46 (broken line) is consequently significantly slower than the rate of discharge of the accumulator A26 (dotted line). Progressively, all of the stage Et6 discharges and the voltage at the terminals of the battery 1 drops accordingly. The discharging time of this failing stage is obviously dependent on the number of accumulators connected in parallel and on the saturation current of the current limiters.

In such a battery, it remains possible to proceed with an equalizing of the charge of the non-failing stages even in the presence of a failing stage. The circuit 2 will be able to determine the presence of a failing accumulator by identifying a branch absorbing a charge current originating from the other branches or by identifying a stage at the terminals of which the voltage varies abnormally compared to the other stages, either during a charge, or during a discharge. It is also possible to identify a stage containing a failing accumulator based on a significant variation of its rate of discharge or of its voltage level since it discharges progressively to reach 0 V.

Figure 11:
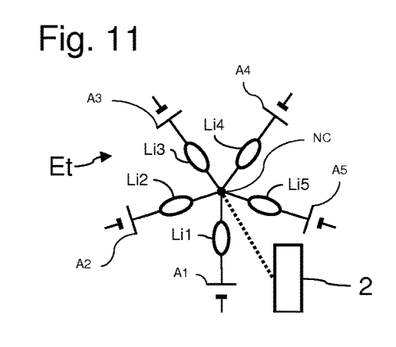
FIG. 11 schematically illustrates an advantageous variant connection of electrochemical cells in a battery stage.

FIG. 11 schematically represents an advantageous variant connection of accumulators in a stage. In the case in point, all the accumulators A1 to A5 of a stage Et have a terminal connected to a common connection node NC via respective current limiters Li1 to Li5. The other terminal of these accumulators A1 to A5 can be connected to another common connection node via other respective current limiters.

Such a structure makes it possible on the one hand to use one-way current limiters. Such a structure also makes it possible to easily determine what area of the battery is failing, the current limiters maintaining an electrical contact with the failing area. Furthermore, the equalizing currents pass only through the charge limiter associated with the accumulator concerned. There is thus no current limiter passed through by charging or equalizing current to a plurality of accumulators, which limits the losses and makes it possible to reduce their dimensioning. To this end, the circuit 2 is here connected to the common connection nodes. Furthermore, such a structure makes it possible to limit the number of transistors integrated in the current limiters.

For current limiters in the direction of charge (current going from the common node to the accumulators), if an accumulator is short-circuited, the charge current supplied by the other accumulators of the stage will necessarily pass through its current limiter. The short-circuited accumulator will therefore be protected from an excessive charge current.

For current limiters in the direction of discharge (current going from an accumulator to the common node), if an accumulator is short-circuited, the discharge currents supplied by the other accumulators of the stage will be limited by their respective current limiters. The short-circuited accumulator will therefore be protected from an excessive charge current by the current limiters of the other accumulators.

Figure 12:
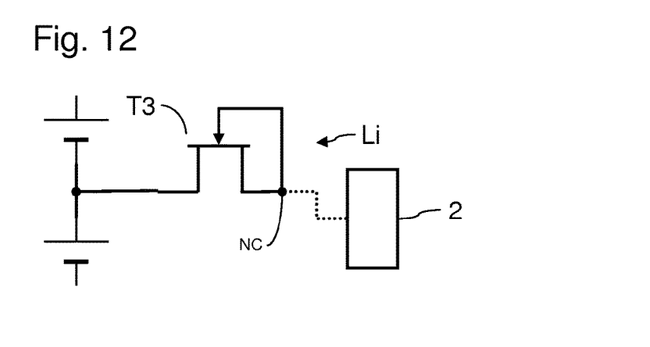
FIG. 12 illustrates a one-way current limiter that can be used in the variant of FIG. 11.

FIG. 12 schematically represents a one-way current limiter Li, based on a JFET transistor T3, limiting the current in the direction from an accumulator to the common node NC.

Different criteria will be able to be taken into account to dimension the saturation current and/or the saturation voltage of the current limiters.

It will notably be possible to use current limiters whose saturation voltage is lower than the nominal voltage of each of the accumulators of the battery 1.

It will also be possible to use an equalizing circuit 2 configured to apply an equalizing current to the accumulators that remains lower than the saturation currents of the current limiters.

The saturation current will also be able to be defined at a nominal current of an accumulator culminating in its complete discharge in one hour.

A battery 1 intended to power an electric motor of a motor vehicle typically exhibits a nominal voltage of between 200 and 500 V. For such a battery, the current limiters will be able to be dimensioned to exhibit a saturation current of between 200 mA and 2 A, for example of the order of 1 A. In order to limit the losses during the charging or the charge equalizing in the battery 1, the current limiters are advantageously dimensioned to exhibit a reduced resistance in the on state, typically less than or equal to $0.1\Omega$, preferably less than $1\Omega$, when the voltage at their terminals is lower than said saturation voltage.

Advantageously, the circuit 2 may implement a voltage clipping at the terminals of the accumulators, for accumulators of lithium-ion type that are incapable of naturally producing this clipping. Such a clipping can be produced by a circuit 2 of relatively small voltage and cost, because of the parallel connection of the accumulators of one and the same stage.

A storage device or power battery whose nominal voltage is generally greater than 100 V will typically comprise a number of modules or batteries connected in series. Each module will then comprise a plurality of stages in series with a plurality of branches in parallel. In the case where an accumulator is failing in one of the modules, the circuit 2 will advantageously be able to control the short-circuiting of this module in order to ensure the continuity of service of the rest of the storage device.

Figure 13:
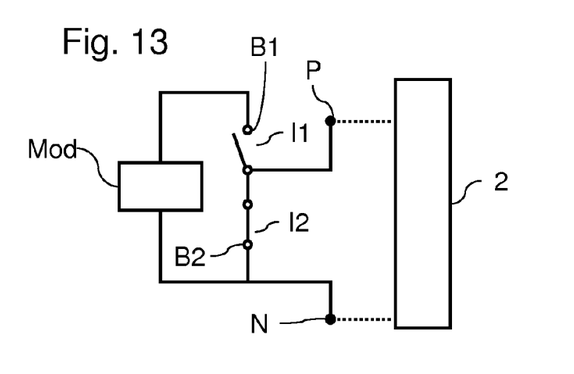
FIG. 13 illustrates an isolation circuit for a battery module including a failing electrochemical cell.

FIG. 13 illustrates an isolation circuit of a module Mod in the event of failure thereof The module Mod comprises terminals B1 and B2 between which it applies its power supply potential difference. The isolation circuit comprises two power output poles P and N, intended to be connected to modules in series or to one of the power terminals of the power storage device. The power circuit comprises two branches connected in parallel between the poles P and N. A first branch includes the switch I1 in series with the module Mod. A second bypass branch includes the switch I2.

The switch I2 is configured to be normally closed, the switch I1 being configured to be normally open. The switch I1 is configured to selectively open/close the branch including the module Mod. The switch I2 is configured to selectively open/close the bypass branch. The closure of the switch I1 is controlled by the circuit 2. In the absence of a control signal applied by the circuit 2, the switch I1 is kept open in order to automatically isolate the module Mod in the event of malfunction. The closure of the switch I2 is controlled by default by the voltage between the terminals B1 and B2. Thus, the normal presence of a voltage between the terminals B1 and B2 keeps the switch I2 open in the absence of other controls, which ensures the short-circuiting of the module Mod by default in the event of malfunction. The opening of the switch I2 must be controlled actively by the circuit 2 in order to apply the voltage of the module Mod to the poles P and N.

The switches I1 and I2 can be transistors of MOSFET type, which can easily be dimensioned appropriately at a relatively low cost. The transistors I1 and I2 can be of nMOS type.

Figure 14:
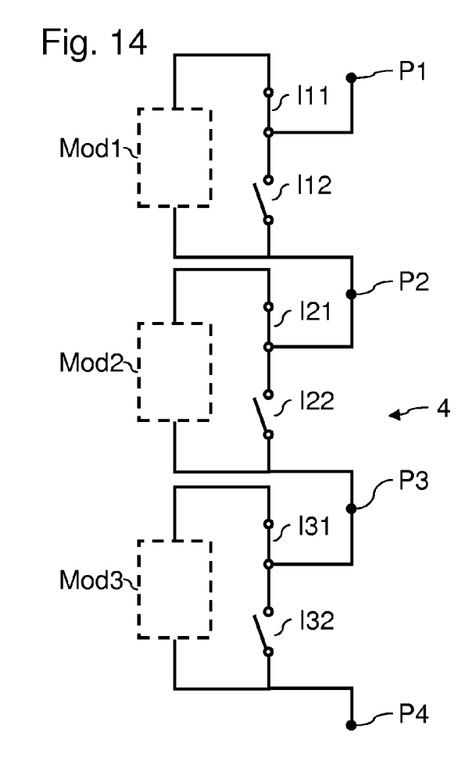
FIG. 14 illustrates a battery including a number of modules in a normal operating mode.

FIG. 14 illustrates a system 4 comprising modules Mod1, Mod2, Mod3 connected in series. The module Mod1 is connected between the poles P1 and P2, the module Mod2 is connected between the poles P2 and P3, the module Mod3 is connected between the poles P3 and P4. The isolation circuit of the module Mod1 comprises switches I11 and I12, the isolation circuit of the module Mod2 comprises switches I21 and I22, the isolation circuit of the module Mod3 comprises switches I31 and I32. In the configuration illustrated, the modules Mod1, Mod2, Mod3 are operational. Consequently, the switches I11, I21 and I31 are closed and their switches I12, I22 and I32 are open, such that the modules Mod1, Mod2, Mod3 are connected in series.

Figure 15:
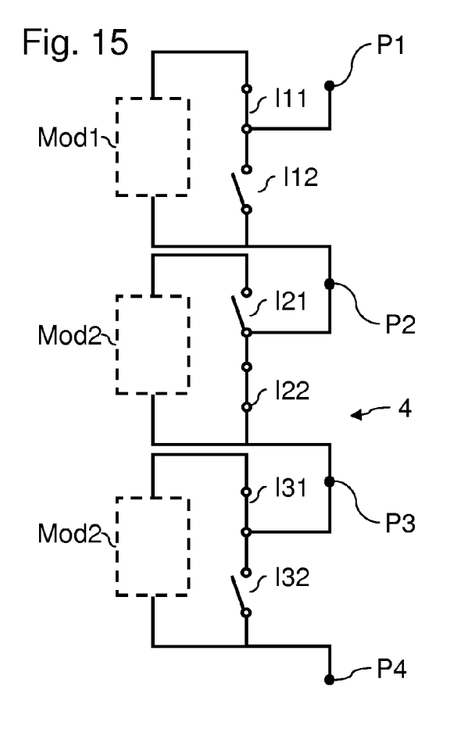
FIG. 15 illustrates the battery of FIG. 14 in a mode of operation in which one of the modules includes a failing electrochemical cell.

FIG. 14 illustrates the system 4 when the module Mod2 experiences a malfunction. When the circuit 2 detects this malfunction, it opens the switch I21 and closes the switch I22. The module Mod2 is thus short-circuited. The module Mod2 can thus be isolated in order to avoid its charging and thus avoid a more serious problem. The system 4 can therefore be used in degraded mode, ensuring its continuity of service.

The invention applies to a battery comprising at least two stages and at least three accumulators in each stage, although a greater number of stages and of accumulators has been mentioned in the different embodiments described.

Current limiters can be produced with bipolar transistors. Below the saturation threshold, the current passing through such a current limiter is then substantially defined by an affine function of the voltage.

The invention claimed is:

1. An accumulator battery comprising stages, wherein said stages are electrically connected in series, wherein each stage comprises at least first, second, and third accumulators electrically connected in parallel, wherein said stages comprise first and second stages, and current limiters via which the first, second, and third accumulators of said first stage are connected in parallel and via which the first, second, and third accumulators of said second stage are connected in parallel, wherein the current limiters comprise at least a first current limiter and a second current limiter, wherein each of the first and second current limiters has terminals across which is applied a voltage, wherein said current limiters comprise at least first and second current limiters, wherein, when said voltage is below a saturation threshold voltage, currents that pass through the first, and second current limiters increase with increasing voltage, and wherein, when the voltage is above the saturation threshold voltage, currents that pass through the first and second third current limiters are substantially constant.

2. The accumulator battery as claimed in claim 1, further comprising a third current limiter, said first, second, and third accumulators of the first stage being connected to a common connection node via, respectively, the first, second, and third current limiters.

3. The accumulator battery as claimed in claim 2, in which said first, second, and third current limiters limit the current unidirectionally between the common connection node (NC) and, respectively, the first, second, and third accumulators.

4. The accumulator battery as claimed in claim 1, in which said current limiters each include a first JFET transistor having a gate, source, and drain, wherein the gate is connected to the source, wherein the is connected to a terminal of one of the accumulators of the first stage, and wherein the drain is connected to a terminal of another of the accumulators of the first stage.

5. The accumulator battery as claimed in claim 1, in which said current limiters each include a first transistor, wherein the first transistor is a depleted MOSFET having a gate, source, and drain, wherein the gate is connected to the source, wherein the source is connected to a terminal of one of the accumulators of the first stage, and wherein the drain is connected to a terminal of one of the accumulators of the first stage.

6. The accumulator battery as claimed in claim 1, in which said current limiters each include a first transistor of enriched MOSFET type and a control circuit configured to keep said MOSFET transistor closed.

7. The accumulator battery as claimed in claims 4, in which said current limiters each include a second transistor of the same type as the first transistor and mounted head-to-tail with the first transistor.

8. The accumulator battery as claimed in claim 1, comprising at least five stages electrically connected in series, each stage including at least first, second, and third lithium-ion LiFeP accumulators that are and electrically connected in parallel via at least two current limiters.

9. The accumulator battery as claimed in claim 1, in which a nominal voltage at the terminals of each of said accumulators is higher than the saturation voltage at the terminals of the current limiters beyond which the current limiters are passed through by a constant saturation current.

10. The accumulator battery as claimed in claim 8, in which each of said current limiters behaves like a resistive circuit exhibiting a resistance lower than 1Ω when the voltage at its terminal is lower than said saturation voltage.

11. The accumulator battery as claimed in claim 1, in which a saturation current of each of the current limiters is at least equal to 50% of the maximum current value for any voltage at the terminals of said current limiter below the saturation threshold.

12. The accumulator battery as claimed in claim 1, in which a saturation current of each of the current limiters is at least equal to the maximum current value for any voltage at the terminals of said current limiter below the saturation threshold.

13. A system comprising an accumulator battery, wherein said accumulator battery comprises at least five stages electrically connected in series, wherein each stage of said accumulator battery comprises terminals, wherein each stage of said accumulator battery comprises a first accumulator, a second accumulator, and a third accumulator, wherein said a first accumulator, a second accumulator, and said third accumulator are connected in parallel, wherein said first accumulator is a lithium-ion LiFeP type accumulator, wherein said second accumulator is a lithium-ion LiFeP type accumulator, wherein said third accumulator is a lithium-ion LiFeP type accumulator, at least first and second current limiters via which the first, second, and third accumulators of said first stage are connected in parallel and via which the first, second, and third accumulators of said second stage are connected in parallel, said current limiters having terminals across which is applied a voltage, wherein, when said voltage is below a saturation threshold voltage, a current that passes through the current limiters increases with increasing voltage, and wherein, when the voltage is above the saturation threshold voltage, the current that passes through the current limiters is a constant saturation current; and an equalizing circuit connected to the terminals of each of the stages of the battery and configured to apply an equalizing current to the first, second, and third accumulators of a stage, wherein the equalizing current has a maximum amplitude that is lower than that of said saturation current.

14. The system as claimed in claim 13, in which a nominal voltage at the terminals of each of said accumulators is higher than the saturation voltage at the terminals of the current limiters beyond which the current limiters are passed through by a constant saturation current, and in which the equalizing circuit is connected to a common connection node of the accumulators of a stage and configured to apply an equalizing current to each of the accumulators of said stage, the equalizing current of each of the accumulators exhibiting a maximum amplitude lower than said saturation current divided by the number of accumulators of said stage.

15. A system, comprising: two batteries that are connected in series, each of which comprises first and second power output poles, each battery including: first and second stages electrically connected in series, each stage including at least first, second, and third accumulators electrically connected in parallel; and current limiters, said current limiters including at least first and second current limiters via which the first, second, and third accumulators of said first stage are connected in parallel and via which the first, second, and third accumulators of said second stage are connected in parallel, said current limiters having terminals across which is applied a voltage, wherein when said voltage is below a saturation threshold voltage, a current that passes through the current limiters increases with increasing voltage, and wherein when the voltage is above the saturation threshold voltage, the current that passes through the current limiters is constant; a securing device associated with one of said batteries and comprising: first and second switches, the first switch being a normally-open switch, the second switch being a normally-closed switch, a power supply voltage for said battery being applied as the default closure control signal for the second switch; and first and second branches connected in parallel between the first and second power output poles, the first branch including a battery and the normally-open switch connected in series, the second branch being selectively opened/closed by the normally-closed switch.

16. The system as claimed in claim 15, further comprising a control circuit which, during the use of the battery associated with the securing device, applies a control signal forcing the closure of the first switch and applies a control signal forcing the opening of the second switch.

17. The system as claimed in claim 15 further comprising: a failure detection circuit connected to the terminals of each of the stages of the battery and configured to detect a malfunction of the battery when the voltage at the terminals of one of said stages diverges from the voltages at the terminals of the other stages.

18. An accumulator battery comprising: first and second stages electrically connected in series, each stage including at least first, second, and third accumulators electrically connected in parallel; wherein the first, second, and third accumulators of the first stage are each electrically connected in series with their respective first, second, and third accumulators of the second stage; and current limiters, wherein said current limiters comprise at least first and second current limiters via which the first, second, and third accumulators of said first stage are connected in parallel and via which the first, second, and third accumulators of said second stage are connected in parallel, said current limiters having terminals across which is applied a voltage, when said voltage is below a saturation threshold voltage a current passes through the current limiters which increases with increasing voltage and when the voltage is above the saturation threshold voltage the current which passes through the current limiters is constant.

19. The accumulator battery of claim 1, wherein the constant current that passes through the current limiters is at least equal to a maximum value of current that flows through the current limiter in response to a voltage across the terminals being below the saturation threshold voltage.

20. The accumulator battery of claim 19, wherein the constant current that passes through the current limiters is 50% greater than the current that flows through the current limiter in response to a voltage across the terminals being below the saturation threshold voltage.

21. The accumulator battery of claim 1, wherein said constant current limits discharge of a short-circuited accumulator selected from the group consisting of said first, second, and third accumulators.

22. The accumulator battery of claim 1, wherein said current limiters are configured to distribute current between said first, second, and third accumulators in the presence of a short-circuited accumulator that is a constituent of said accumulator battery.

23. The accumulator battery of claim 1, wherein said constant current is non-zero.

* * * * *